(12) United States Patent
Jeong et al.

(10) Patent No.: US 10,128,759 B2
(45) Date of Patent: Nov. 13, 2018

(54) POWER SUPPLYING APPARATUS WITH PIEZOELECTRIC TRANSFORMERS

(71) Applicant: SAMSUNG ELECTRO-MECHANICS CO., LTD., Suwon-si (KR)

(72) Inventors: In Wha Jeong, Suwon-si (KR); Hugh Kim, Suwon-si (KR); Ju Rae Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/196,584

(22) Filed: Jun. 29, 2016

(65) Prior Publication Data

US 2017/0133937 A1  May 11, 2017

(30) Foreign Application Priority Data

Nov. 9, 2015 (KR) .................. 10-2015-0156528

(51) Int. Cl.
*H02M 7/493* (2007.01)
*H02M 3/28* (2006.01)
*H02M 3/335* (2006.01)
*H02M 7/04* (2006.01)

(52) U.S. Cl.
CPC ....... *H02M 3/285* (2013.01); *H02M 3/33569* (2013.01); *H02M 7/043* (2013.01)

(58) Field of Classification Search
CPC .. H02M 3/285; H02M 7/043; H02M 3/33569; H02M 3/33523; H02M 7/493; H02M 7/49; H02M 3/1584; H02M 2003/1586; H02M 3/1588; H05B 41/2822; Y02B 70/1416; Y02B 70/1433
USPC .............................. 323/272; 363/71; 310/318
See application file for complete search history.

(56) References Cited

U.S. PATENT DOCUMENTS

| 4,517,472 | A | * | 5/1985 | Ruitberg | H02M 3/3388 |
| | | | | | 307/82 |
| 5,866,969 | A | * | 2/1999 | Shimada | H01L 41/044 |
| | | | | | 310/318 |
| 5,923,542 | A | * | 7/1999 | Sasaki | H02M 7/48 |
| | | | | | 310/318 |
| 6,052,300 | A | * | 4/2000 | Bishop | H01L 41/044 |
| | | | | | 310/316.01 |
| 8,743,570 | B2 | * | 6/2014 | Mueller | H02J 1/102 |
| | | | | | 363/120 |
| 8,830,703 | B2 | * | 9/2014 | Murofushi | H02M 3/33561 |
| | | | | | 323/272 |
| 2003/0234835 | A1 | * | 12/2003 | Torii | B41J 2/14233 |
| | | | | | 347/68 |

(Continued)

FOREIGN PATENT DOCUMENTS

| JP | 2008-72827 A | 3/2008 |
| KR | 10-2006-0101969 A | 9/2006 |
| KR | 10-2010-0066078 A | 6/2010 |

*Primary Examiner* — Alex Torres-Rivera
(74) *Attorney, Agent, or Firm* — NSIP Law

(57) ABSTRACT

A power supplying apparatus includes a first piezoelectric transformer operated at a first operating frequency, a second piezoelectric transformer operated alternately with the first piezoelectric transformer and operated at a second operating frequency, wherein the second operating frequency is a multiple of the first operating frequency.

18 Claims, 7 Drawing Sheets

(56) References Cited

U.S. PATENT DOCUMENTS

| | | | | |
|---|---|---|---|---|
| 2005/0030774 | A1* | 2/2005 | Vazquez Carazo | H02M 7/003 363/84 |
| 2005/0062433 | A1* | 3/2005 | Ongaro | H05B 41/3922 315/209 PZ |
| 2005/0157524 | A1* | 7/2005 | Yun-Xiu | H02M 3/1584 363/65 |
| 2008/0316776 | A1* | 12/2008 | Nakanishi | H02M 3/3353 363/21.02 |
| 2009/0058229 | A1* | 3/2009 | Ibata | H01L 41/107 310/351 |
| 2010/0066204 | A1* | 3/2010 | Hayashi | H01L 41/044 310/318 |
| 2010/0188068 | A1* | 7/2010 | Knowles | H01L 41/044 323/355 |
| 2013/0257227 | A1* | 10/2013 | Kartashev | H01L 41/0471 310/339 |
| 2015/0349649 | A1* | 12/2015 | Zane | H02M 3/33507 363/21.03 |

* cited by examiner

I-I'

POWER SUPPLYING APPARATUS WITH PIEZOELECTRIC TRANSFORMERS

CROSS-REFERENCE TO RELATED APPLICATION

This application claims the priority and benefit under 35 USC § 119(a) of Korean Patent Application No. 10-2015-0156528, filed on Nov. 9, 2015 with the Korean Intellectual Property Office, the entire disclosure of which is incorporated herein by reference for all purposes.

BACKGROUND

1. Field

The following description relates to a power supply apparatus.

2. Description of Related Art

Demand for the miniaturization of a power supplying apparatus has increased due to miniaturization of electronic products using such power supplying apparatus. power supplying apparatus using a piezoelectric transformer has been developed to reduce the size of the power supply apparatus.

For power supply apparatus using a piezoelectric transformer according to the related art, harmonics may be generated at an operating frequency of alternating current (AC) power operating the piezoelectric transformer, and thus an output of the piezoelectric transformer pulsates.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a small power supplying apparatus ensuring a stable output.

In one general aspect there is provided a power supplying apparatus including a first piezoelectric transformer operated at a first operating frequency, and a second piezoelectric transformer operated alternately with the first piezoelectric transformer and operated at a second operating frequency, and wherein the second operating frequency is a multiple of the first operating frequency.

The power supplying apparatus may include a first switch configured to be switched at the first operating frequency to provide first alternating current (AC) power to the first piezoelectric transformer, and a second switch configured to be switched at the second operating frequency to provide second AC power to the second piezoelectric transformer.

The second switch may be configured to receive harmonics generated by the first switch.

The first switch and the first piezoelectric transformer may be connected to the second switch and the second piezoelectric transformer in parallel.

The first piezoelectric transformer may have a resonance frequency corresponding to the first operating frequency.

The second AC power may have a phase difference of 90 degrees or 180 degrees from the first AC power.

The power supplying apparatus may include an input-side rectifier configured to receive and rectify commercial AC power, and a smoothing unit configured to smooth an output of the input-side rectifier and to supply the smoothed power to the first and second switches.

The power supplying apparatus may include an output-side rectifier configured to receive an output of the first piezoelectric transformer and an output of the second piezoelectric transformer and to rectify the outputs.

A switching frequency of the first switch may be increased, in response to an increase in a voltage of the commercial AC power.

The second switch may be configured to receive harmonics generated by the first switch and the smoothed power as input power.

In another general aspect there is provided a power supplying apparatus including a first piezoelectric transformer configured to have a first resonance frequency, and a second piezoelectric transformer configured to have a second resonance frequency and to be operated alternately with the first piezoelectric transformer, and wherein the second resonance frequency is a multiple of the first resonance frequency.

The power supplying apparatus may include a first switch configured to be switched at a first operating frequency to provide first AC power to the first piezoelectric transformer, and a second switch configured to be switched at a second operating frequency to provide second AC power to the second piezoelectric transformer.

The first operating frequency may correspond to the first resonance frequency, and the second operating frequency may correspond to the second resonance frequency.

The second AC power may have a phase difference of 90 degrees or 180 degrees from the first AC power.

The second switch may be configured to receive some of harmonics generated by the first switch unit.

The second switch may be operated alternately with the first switch unit.

The first piezoelectric transformer may include an input piezoelectric layer including layers stacked in a first direction, an output piezoelectric layer including layers stacked in a second direction, and an insulating layer separating the input piezoelectric layer and the output piezoelectric layer.

A polarization direction of the first direction may be perpendicular to a polarization direction of the second direction.

The insulating layer may be formed of a thin film material that is soft.

The insulating layer may include a hollow portion.

According to another aspect of the present disclosure, a power supplying apparatus may include: a first piezoelectric transformer having a first resonance frequency; and a second piezoelectric transformer operated alternately with the first piezoelectric transformer and having a second resonance frequency, and wherein the second resonance frequency is a multiple of the first resonance frequency.

Other features and aspects will be apparent from the following detailed description, the drawings, and the claims.

Figure 1:
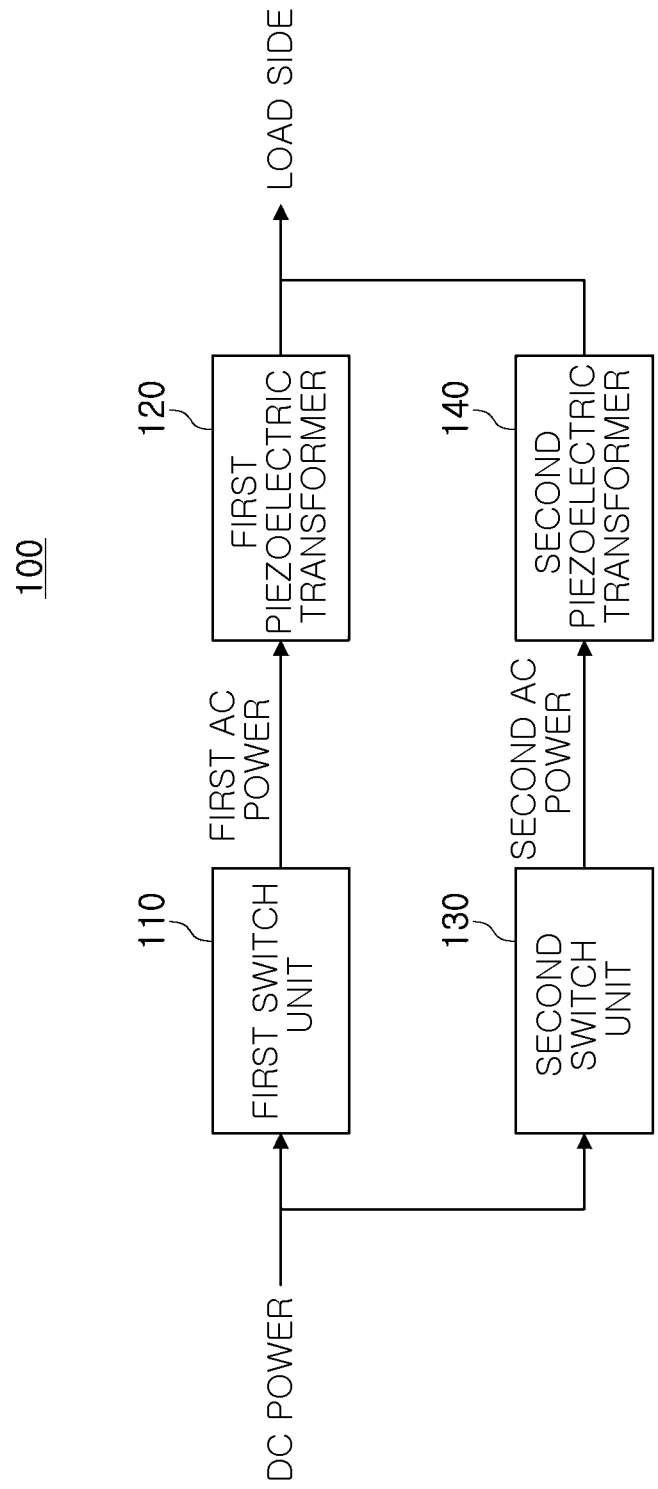
FIG. 1 is a diagram illustrating an example of a power supplying apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise.

In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing.

FIG. 1 is a diagram illustrating an example of a power supplying apparatus 100. As a non-exhaustive illustration only, the power supplying apparatus 100 may be incorporated in devices such as, for example, a camera, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or any other consumer electronics/information technology(CE/IT) device. In an example, the device incorporating the power supplying apparatus 100 may be implemented in a smart appliance, an intelligent vehicle, or in a smart home system.

The device incorporating the power supplying apparatus 100 may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

Referring to FIG. 1, a power supplying apparatus 100 includes a first switch 110, a first piezoelectric transformer 120, a second switch 130, and a second piezoelectric transformer 140. In an example, the first switch 110 and the second switch 130 may receive direct current (DC) power. The first switch 110 may be switched at a first operating frequency to provide first alternating current (AC) power to the first piezoelectric transformer 120.

The first piezoelectric transformer 120 may receive the first AC power and transform the first AC power. The first piezoelectric transformer 120 may be operated at a frequency of the first AC power, i.e., the first operating frequency.

The first switch 110 may be switched at the first operating frequency to provide the first AC power having the first operating frequency to the first piezoelectric transformer 120. Since the first piezoelectric transformer 120 vibrates depending on the first AC power to perform transformation, the first piezoelectric transformer 120 may vibrate at the first operating frequency to perform the transformation. v The second switch 130 may be switched at a second operating frequency to provide second AC power to the second piezoelectric transformer 140.

The second piezoelectric transformer 140 may receive the second AC power and transform the second AC power. The second piezoelectric transformer 140 may be operated at a frequency of the second AC power, i.e., the second operating frequency.

As shown in FIG. 1, in an example, the first switch 110 and the first piezoelectric transformer 120 is connected to the second switch 130 and the second piezoelectric transformer 140 in parallel.

The first switch 110 may be operated in an interleave scheme with the second switch 130. For example, the first switch 110 may be operated alternately with the second switch 130. Therefore, the first piezoelectric transformer 120 and the second piezoelectric transformer 140 may be operated alternately with each other. Accordingly, a load side may receive the sum of an output of the first piezoelectric transformer 120 and an output of the second piezoelectric transformer 140. As described above, a pair of transformers are used in the interleave scheme, whereby a more stable output may be provided.

In an embodiment, the second AC power may have a phase difference of 90 degrees or 180 degrees from the first AC power. That is, the second switch 130 may be switched alternately with the first switch 110, and accordingly, the output of the first piezoelectric transformer 120 and the output of the second piezoelectric transformer 140 may have a phase difference of 90 degrees or 180 degrees therebetween. A phase difference of 270 degrees may be the same as a phase difference of 90 degrees depending on a change of a reference transformer.

In an embodiment, the second operating frequency may be a multiple of the first operating frequency. That is, an operating frequency of the second switch 130 may be n times (here, n is a natural number of 2 or more) the operating frequency of the first switch 110.

In an embodiment, an operating frequency of the first piezoelectric transformer 120 and an operating frequency of the second piezoelectric transformer 140 may be different from each other. In an example, the operating frequency of the second piezoelectric transformer 140 may be a multiple of the operating frequency of the first piezoelectric transformer 120.

When harmonics are generated by a switching operation of the first switch 110, a separate circuit for removing the harmonics is configured or a pulsation phenomenon due to the harmonics occurs.

However, in an embodiment, since the second switch 130 is operated at n times (in an example, n is a natural number of 2 or more) the operating frequency of the first switch 110, n-harmonics may be removed through the second switch 130. At least some of the n-harmonics generated by an operation of the first switch 110 may be introduced into the second switch 130 as an input voltage of the second switch 130. Therefore, in the power supplying apparatus 100, an influence due to harmonics generated in the first switch 110 may be reduced.

The harmonics introduced into the second switch 130 may be used as power of the second switch 130. A basic wave in the power input to the first switch 110 becomes power of the first switch 110, but harmonics are lost as heat, noise, and the like. However, some harmonics having a frequency corresponding to the operating frequency of the second switch 130 may be input to the second switch 130 as power. As a result, the second switch 130 may receive some of the harmonic generated in the first switch 110 as well as power provided from a smoothing unit 220 (shown in FIGS. 2 and 3) as power. Thus, overall energy efficiency of the power supplying apparatus is improved.

In an embodiment, the first piezoelectric transformer 120 has a resonance frequency corresponding to the first operating frequency, and the second piezoelectric transformer 140 has a resonance frequency corresponding to the second operating frequency. In an example, the resonance frequency of the second piezoelectric transformer 140 is a multiple of the resonance frequency of the first piezoelectric transformer 120.

In an example, the first switch 110 may be switched depending on the resonance frequency of the first piezoelectric transformer 120, and the second switch 130 may be switched depending on the resonance frequency of the second piezoelectric transformer 140.

When the switches are operated at the resonance frequencies of the piezoelectric transformers, transformation efficiency of the piezoelectric transformer, i.e., a voltage gain, is highest, and therefore, the most efficient output may be provided in the present exemplary embodiment.

Figure 2:
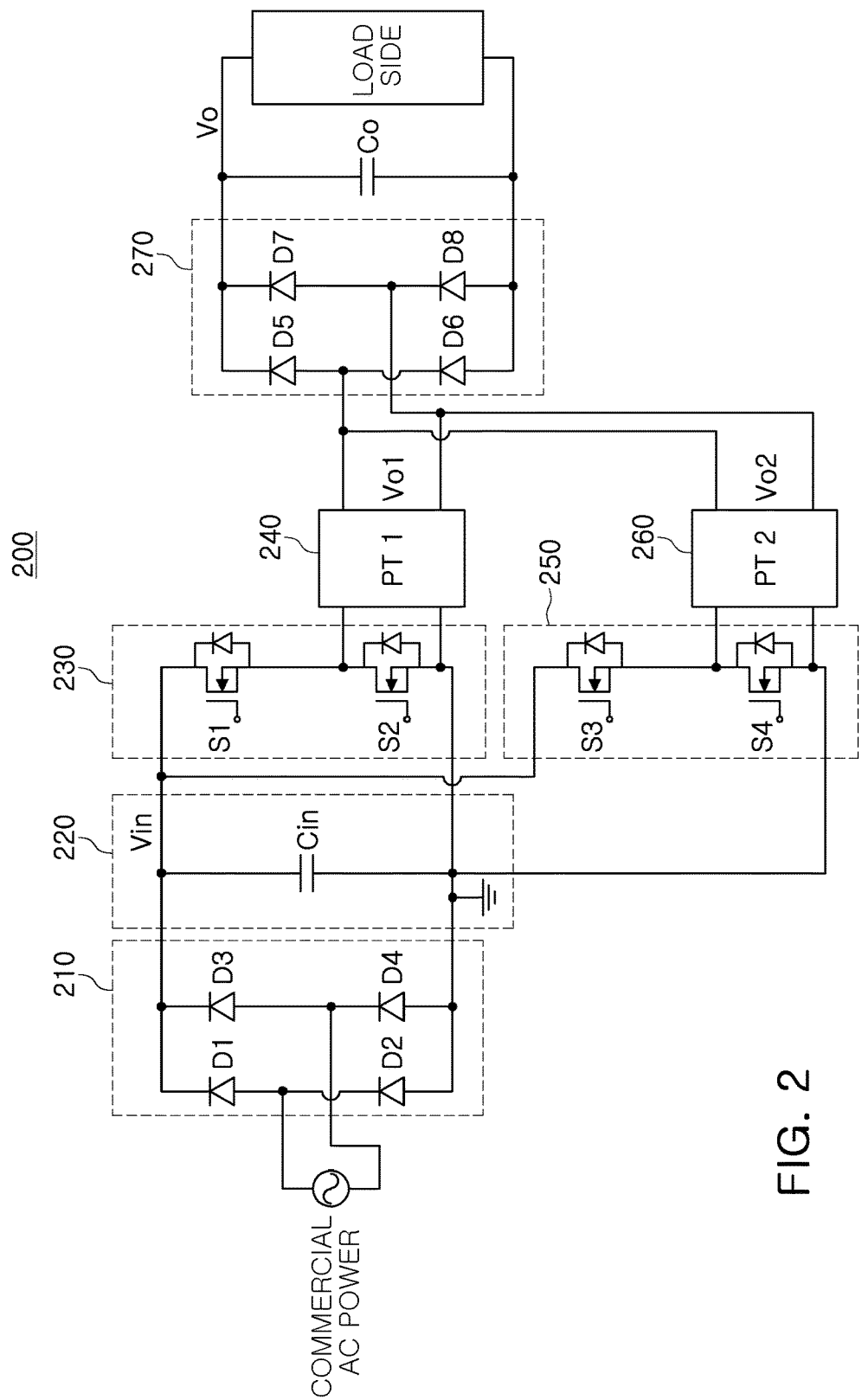
FIG. 2 is a diagram illustrating an example of the power supplying apparatus.

FIG. 2 is a diagram illustrating the power supplying apparatus 200 according to an embodiment. In addition to the description of FIG. 2 below, the above descriptions of FIG. 1 is also applicable to FIG. 2 and are incorporated herein by reference. Thus, the above description may not be repeated here.

Referring to FIG. 2, in an example, a power supplying apparatus 200 includes an input-side rectifier 210, a smoothing unit 220, a first switch 230, a first piezoelectric transformer 240, a second switch 250, and a second piezoelectric transformer 260. In an example, the power supplying apparatus 200 may include an output-side rectifier 270.

In an example, the input-side rectifier 210 receives and rectifies commercial AC power. In an example, the input-side rectifier 210 includes a bridge rectifying circuit including four diodes D1 to D4. The input-side rectifier 210 may include various rectifying circuits, without departing from the spirit and scope of the illustrative examples described.

The smoothing unit 220 may smooth an output of the input-side rectifier 210. In an example, the smoothing unit 220 includes a smoothing capacitor Cin. The first and second switches 230 and 250 may be switched by receiving the power smoothed in the smoothing unit 220.

The first switch 230 may be switched at a first operating frequency to operate the first piezoelectric transformer 240. The second switch 250 may be switched at a second operating frequency to operate the second piezoelectric transformer 260. In an example, the first switch 230 and the second switch 250 is alternately operated in an interleave scheme.

The first and second switches 230 and 250 and the first and second piezoelectric transformers 240 and 260 may be understood from the description described with reference to FIG. 1, which is incorporated herein by reference. Thus, the above description may not be repeated here.

In an example illustrated in FIG. 2, the first switch 230 and the second switch 250 includes a half bridge inverter. However, the half bridge inverter is an example, and the first switch 230 and the second switch 250 may include another kind of inverter such as, for example, a full bridge inverter or a three-phase inverter, without departing from the spirit and scope of the illustrative examples described.

The output-side rectifier 270 may receive an output of the first piezoelectric transformer 240 and an output of the second piezoelectric transformer 260. The output-side rectifier 270 may rectify the received outputs. An output of the output-side rectifier 270 may be provided to a smoothing capacitor Co, and the smoothing capacitor Co may supply power to a load.

The first piezoelectric transformer 240 and the second piezoelectric transformer 260 may be alternately operated, and the output-side rectifier 270 may receive the outputs of the first piezoelectric transformer 240 and the second piezoelectric transformer 260 that are alternately operated. Therefore, the output-side rectifier 270 may receive more stable power as compared to a case of using one piezoelectric transformer.

An operating frequency of the second switch 250 may be a multiple of an operating frequency of the first switch 230. Therefore, harmonics by a switching operation of the first switch 230 may be removed by the second switch 250.

Figure 3:
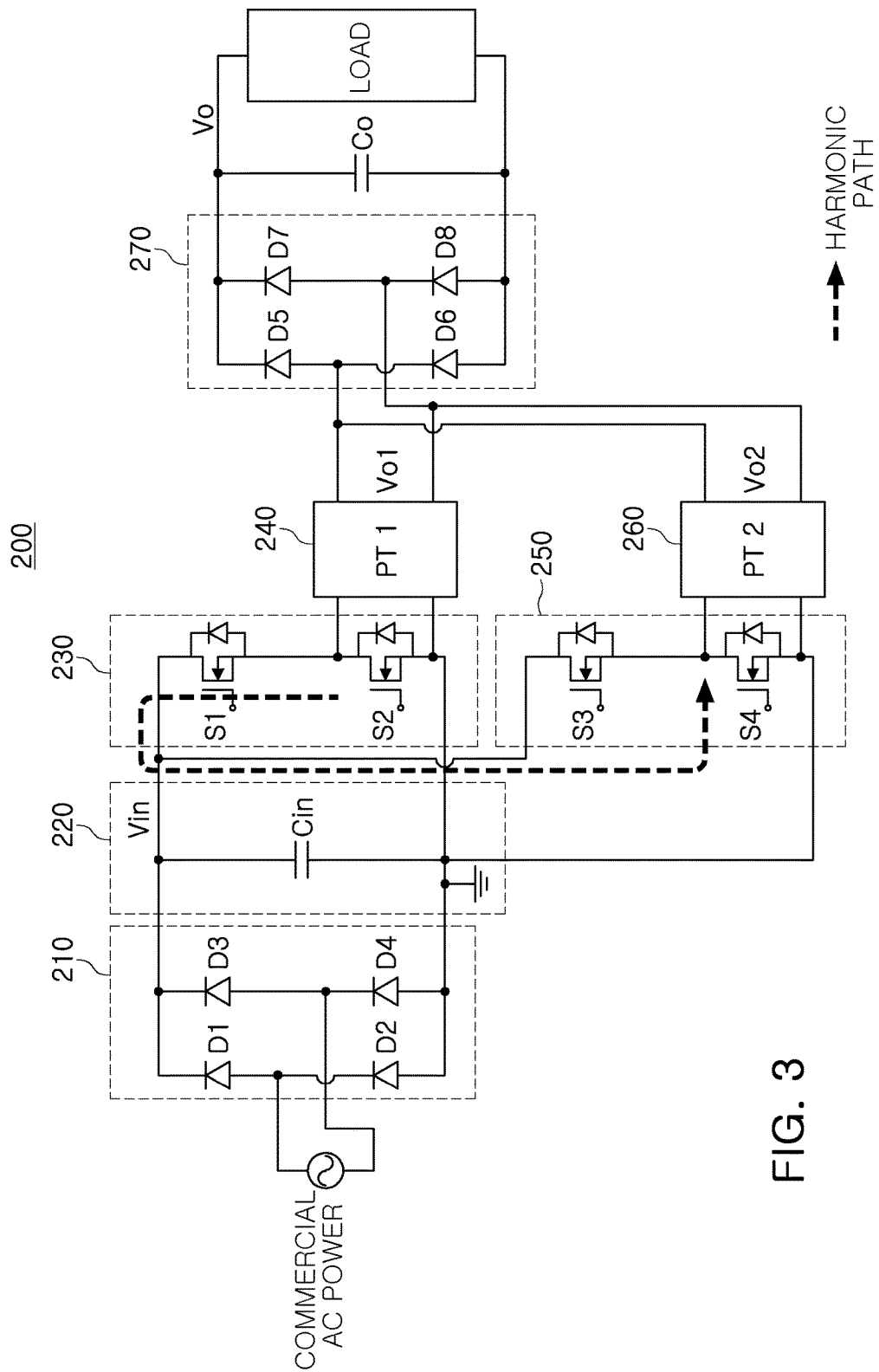
FIG. 3 is a diagram illustrating an example of a harmonic path in the power supplying apparatus illustrated in FIG. 2.

FIG. 3 is a diagram illustrating an example of a harmonic path in the power supplying apparatus illustrated in FIG. 2. Referring to FIG. 3, harmonics may be generated by the switching operation of the first switch 230. Since the operating frequency of the second switch 250 is a multiple of the operating frequency of the first switch 230, the harmonics generated by the switching of the first switch 230 may flow to the second switch 250 along a path illustrated in FIG. 3.

Some of the harmonics generated by the switching operation of the first switch 230 may flow to the second switch 250. Thus, the harmonics generated by the switching operation of the first switch 230 may be removed within the power supplying apparatus, without using a separate circuit for attenuating the harmonics.

Since the harmonics input to the second switch 250 is a part of energy, the harmonics may constitute input power of the second switch 250. Some of the harmonics generated by the switching operation of the first switch 230 may serve as the input power of the second switch 250. Because some of the harmonics are reused as energy, the power supplying apparatus may have high power efficiency.

Figure 4:
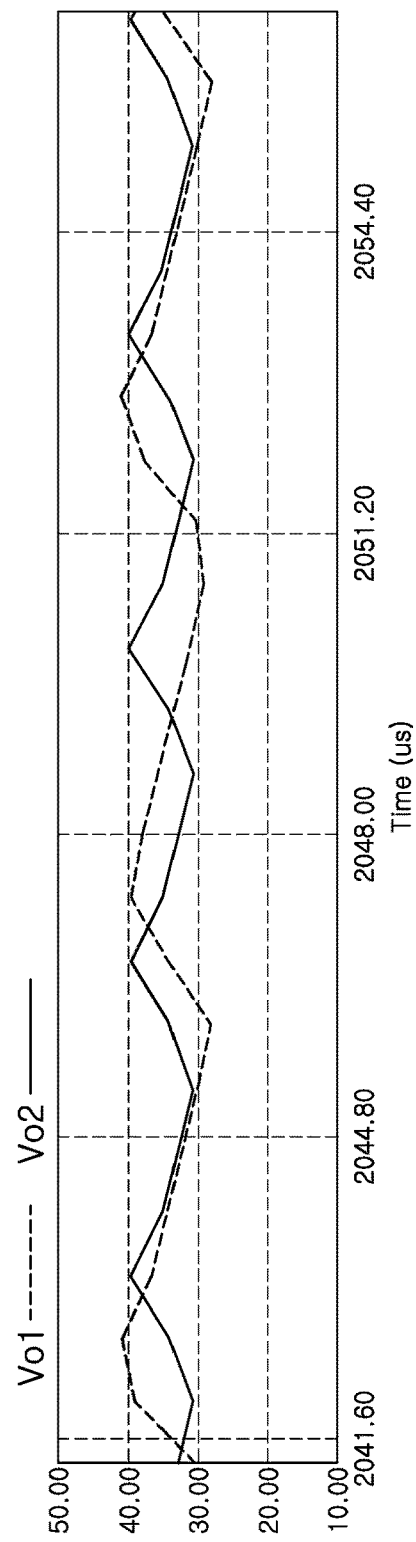
FIG. 4 is a diagram illustrating an example of outputs of first and second piezoelectric transformers illustrated in FIG. 2.
Figure 5:
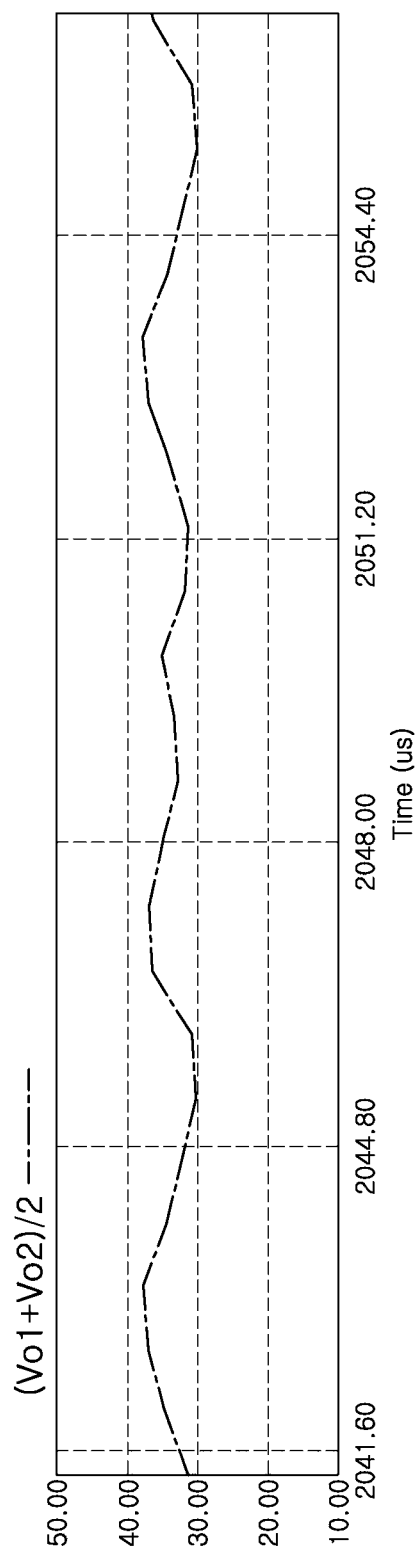
FIG. 5 is a diagram illustrating an example of an average of the sum of outputs of first and second piezoelectric transformers illustrated in FIG. 2.

FIG. 4 is a diagram illustrating an example of rectified outputs of first and second piezoelectric transformers illustrated in FIG. 2, and FIG. 5 is a diagram illustrating an example of an average of the sum of rectified outputs of first and second piezoelectric transformers illustrated in FIG. 2.

In FIG. 4, a rectified output Vo1 of the first piezoelectric transformer 240 having a resonance frequency of 100 kHz and a rectified output Vo2 of the second piezoelectric transformer 260 having a resonance frequency of 200 kHz are illustrated. The rectified output Vo2 of the second piezoelectric transformer 260 may have a frequency different from that of the rectified output Vo1 of the first piezoelectric transformer 240, but may have a phase difference of 90 degrees from the rectified output Vo1 of the first piezoelectric transformer 240.

In the graph of FIG. 5, an average value of the rectified output Vo1 and the rectified output Vo2 of FIG. 4 is illustrated. As illustrated in FIG. 5, the sum of the rectified output Vo1 and the rectified output Vo2 has a gentler output value to be in a more stable state.

In an embodiment, when a voltage magnitude of commercial AC power is changed, the power supplying apparatus may adjust a switching frequency depending on the change in the voltage magnitude.

Figure 6:
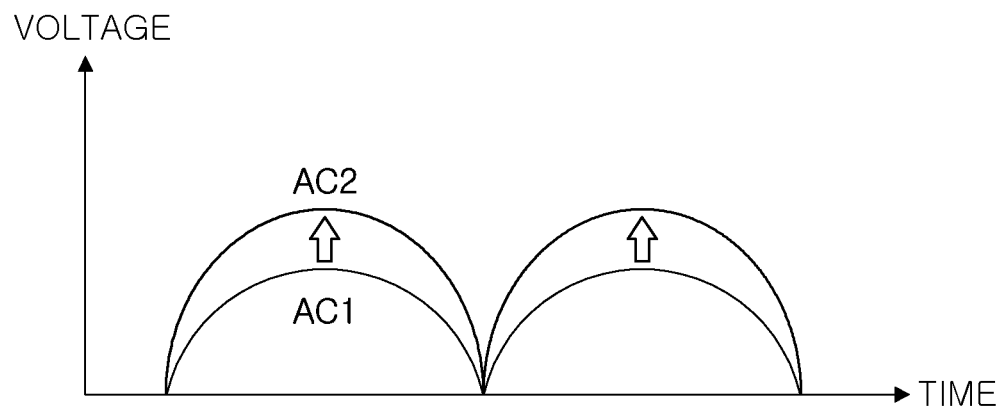
FIG. 6 is a diagram illustrating an example of a change in commercial alternating current (AC) power.
Figure 7:
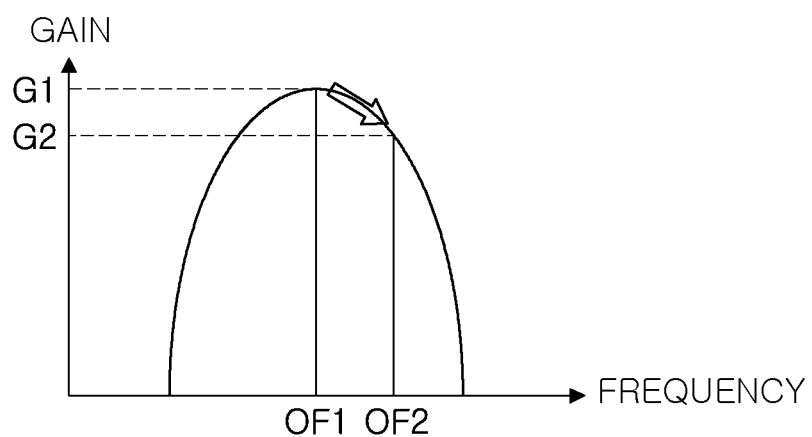
FIG. 7 is a diagram illustrating an example of adjusting a resonance frequency depending on the change in the commercial AC power illustrated in FIG. 6.

FIG. 6 is a diagram illustrating an example of a change in commercial AC power, and FIG. 7 is a diagram illustrating an example of adjusting a resonance frequency depending on the change in the commercial AC power illustrated in FIG. 6. A change in a switching frequency depending on a change in a voltage magnitude of commercial AC power is described with reference to FIGS. 2, 6, and 7.

FIG. 6 illustrates an example where a magnitude of commercial AC power is changed from a first level AC1 to a second level AC2. The commercial AC power illustrated in FIG. 6 may be an output of the input-side rectifier 210 of FIG. 2.

A graph representing a relationship between a frequency of a piezoelectric transformer and a gain is illustrated in FIG. 7.

In an example, the first switch 230 may be switched depending on a resonance frequency OF1 of the first piezoelectric transformer 240, i.e., an operating frequency of the first switch 230 may correspond to the resonance frequency OF1 of the first piezoelectric transformer 240.

As described above with reference to FIG. 6, when the voltage magnitude of the commercial AC power is changed from the first level AC1 to the second level AC2, the operating frequency of the first switch 230 may be changed from the resonance frequency OF1 of the first piezoelectric transformer 240 into a second frequency OF2 depending on the change. That is, the operating frequency of the first switch 230 may exceed the resonance frequency OF1 of the first piezoelectric transformer 240.

Therefore, a gain is reduced from a first gain G1 to a second gain G2, lower than the first gain G1.

When a commercial AC voltage is increased, when the operating frequency of the first switch 230 is not changed, an output of the first piezoelectric transformer 240 may also be increased. Therefore, a constant output may not be provided.

Therefore, when the commercial AC voltage is increased, the operating frequency of the first switch 230 may be set to be different from the resonance frequency of the first piezoelectric transformer 240, thereby allowing an output of the first piezoelectric transformer 240 to be constant.

Figure 8:
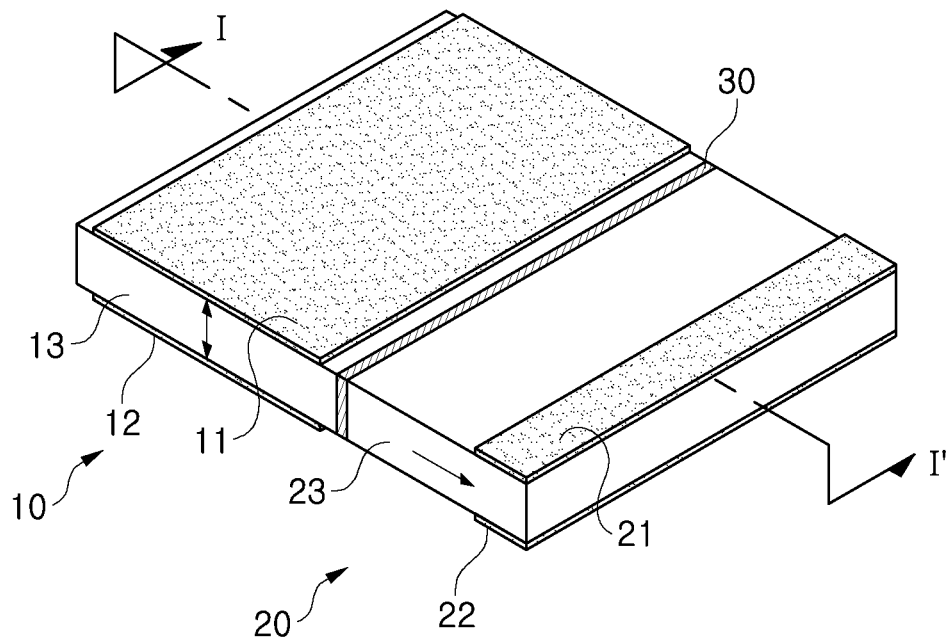
FIG. 8 is a diagram illustrating an example of a piezoelectric transformer.
Figure 9:
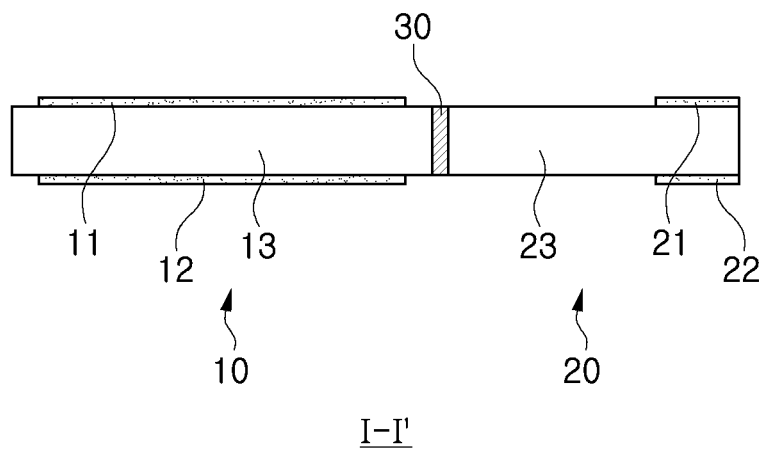
FIG. 9 is a diagram illustrating an example of the piezoelectric transformer taken along line I-I' of FIG. 8.

An example of a piezoelectric transformer that is used in a power supplying apparatus is described with reference to FIGS. 8 and 9. In an example, the piezoelectric transformer described in FIGS. 8 and 9 is a bar type piezoelectric transformer. However, the bar type piezoelectric transformer is only one example of the piezoelectric transformer, various other piezoelectric transformers such as, for example, circular piezoelectric transformer, or multilayer piezoelectric transformer are considered to be well within the scope of the present disclosure.

FIG. 8 is a diagram illustrating an example of a piezoelectric transformer, and FIG. 9 is an example of a cross-sectional view of the piezoelectric transformer taken along line I-I' of FIG. 8.

Referring to FIGS. 8 and 9, a piezoelectric transformer, which is a transformer using a piezoelectric effect, may include two piezoelectric layers 10 and 20 separated from each other by an insulating layer 30.

In an example of FIG. 8, a first piezoelectric layer 10 to which input power is input by a switch is called an input piezoelectric layer, and the other piezoelectric layer 20 is called an output piezoelectric layer. However, in other embodiments, and the first piezoelectric layer 10 may be the input piezoelectric layer as well as the output piezoelectric layer.

The input piezoelectric layer 10 may include a plurality of piezoelectric layers 13 stacked in a first direction (a vertical direction) and input electrodes 11 and 12. In an example, the input electrodes 11 and 12 are formed on opposing surfaces of an input piezoelectric element 13 to apply an input voltage.

The output piezoelectric layer 20 may include a plurality of piezoelectric layers 23 stacked in a second direction (a horizontal direction) and output electrodes 21 and 22. In an example, the output electrodes 21 and 22 are formed on opposing surfaces of an output piezoelectric element 23 in order to output an output voltage.

In an example, internal electrodes (not illustrated) may be alternately formed on the plurality of piezoelectric layers 13 and 23. These internal electrodes may be connected to the input electrodes or the output electrodes, respectively, depending on polarities thereof.

Polarization directions of the input piezoelectric layer 10 and the output piezoelectric layer 20 may be different from each other. In an example illustrated in FIGS. 8 and 9, a polarization direction of the input piezoelectric layer 10 is a first direction, and a polarization direction of the output piezoelectric layer 20 is a direction perpendicular to the first direction.

When AC power is applied to the input piezoelectric layer 10, the input piezoelectric layer 10 may vibrate, and a vibration may also be generated in the output piezoelectric layer 20 by the vibration of the input piezoelectric layer 10. The output piezoelectric layer 20 may output electrical energy from the generated vibration.

In the example described above, since the polarization direction of the input piezoelectric layer 10 is a vertical direction, when the commercial AC power is applied to the input piezoelectric layer 10, the input piezoelectric layer 10 may vibrate in the vertical direction. A vibration in a horizontal direction may be generated in the output piezoelectric layer 20 by the vibration described above, and may be converted into electrical energy, and the electrical energy may be output.

The vibration of the output piezoelectric layer 20 generated by the vibration of the input piezoelectric layer 10 may have kinetic energy less than that of the vibration of the input piezoelectric layer 10. Therefore, the piezoelectric transformer may serve as a step-down transformer.

An insulating layer 30 may be formed between the input piezoelectric layer 10 and the output piezoelectric layer 20 to electrically insulate the input piezoelectric layer 10 and the output piezoelectric layer 20 from each other. Therefore, in the power supplying apparatus, an input terminal and an output terminal are electrically disconnected from each other by the insulating layer 30, and thus, an influence of an electromagnetic wave in an output may be blocked without using a separate electromagnetic interference (EMI) circuit.

The insulating layer 30 may be formed of various materials having an insulation property, such as, for example, ceramic material having a high insulation property, or a sheet or a film formed of a resin.

As another example, the insulating layer 30 may be formed of a thin film having an insulation property and having softness. When the insulating layer 30 is formed of a ceramic material, fatigue by a vibration may cause a crack in or damage to the insulating layer 30. The vibration of the input piezoelectric layer may also not be smoothly transferred to the output piezoelectric layer 20 due to rigidity of the ceramic material.

In an embodiment, at least one hollow portion may be formed in the insulating layer 30. Since the hollow portion is filled with air or is formed as an empty space, which is in a vacuum state, the input piezoelectric layer 10 and the output piezoelectric layer 20 may be electrically disconnected from each other through the hollow. The volume of the insulating layer 30 with the hollow may be reduced as compared to an insulating layer 30 without the hollow, and may efficiently transfer the vibration to the output piezoelectric layer 20 while significantly reducing attenuation of the vibration of the input piezoelectric layer 10 at a minimum area.

As set forth above, the power supplying may reduce pulsation of an output to provide a stable output.

The power supplying apparatus disclosed above may block an influence of an electromagnetic wave without using a separate electromagnetic interference (EMI) circuit.

The apparatuses, units, modules, devices, and other components illustrated that perform the operations described herein with respect to FIGS. 1-3 and 8-9 are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power supplying apparatus comprising:
   a first switch configured to be switched at a first operating frequency to provide first power to a first piezoelectric transformer, wherein the first piezoelectric transformer is operated at the first operating frequency; and
   a second switch configured to be switched at a second operating frequency to provide second power to a second piezoelectric transformer, wherein the second piezoelectric transformer is operated alternately with the first piezoelectric transformer and operated at the second operating frequency,
   wherein the second operating frequency is n-multiples of the first operating frequency, and
   wherein a subset of n-harmonics generated upon switching of the first switch is input into the second switch, where n is an integer.

2. The power supplying apparatus of claim 1, wherein the second switch is further configured to receive harmonics generated by the first switch.

3. The power supplying apparatus of claim 1, wherein the first switch and the first piezoelectric transformer are connected to the second switch and the second piezoelectric transformer in parallel.

4. The power supplying apparatus of claim 1, wherein the first piezoelectric transformer has a resonance frequency corresponding to the first operating frequency.

5. The power supplying apparatus of claim 1, wherein the second power has a phase difference of 90 degrees or 180 degrees from the first power.

6. The power supplying apparatus of claim 1, further comprising:
   an input-side rectifier configured to receive and rectify commercial power; and
   a smoothing unit configured to smooth an output of the input-side rectifier and to supply a smoothed power to the first and second switches.

7. The power supplying apparatus of claim 1, further comprising an output-side rectifier configured to receive an output of the first piezoelectric transformer and an output of the second piezoelectric transformer and to rectify the outputs.

8. The power supplying apparatus of claim 6, wherein a switching frequency of the first switch is increased, in response to an increase in a voltage of the commercial power.

9. The power supplying apparatus of claim 6, wherein the second switch is further configured to receive harmonics generated by the first switch and the smoothed power as input power.

10. A power supplying apparatus comprising:
    a first switch configured to be switched at a first operating frequency to provide first power to a first piezoelectric transformer, wherein the first piezoelectric transformer is configured to have a first resonance frequency; and
    a second switch configured to be switched at a second operating frequency to provide second power to a second piezoelectric transformer, wherein the second piezoelectric transformer is configured to have a second resonance frequency and to be operated alternately with the first piezoelectric transformer,
    wherein the second resonance frequency is n-multiples of the first resonance frequency, and
    wherein a subset of n-harmonics generated upon switching of the first switch is input into the second switch, where n is an integer.

11. The power supplying apparatus of claim 10, wherein:
the first operating frequency corresponds to the first resonance frequency; and
the second operating frequency corresponds to the second resonance frequency.

12. The power supplying apparatus of claim 10, wherein the second power has a phase difference of 90 degrees or 180 degrees from the first power.

13. The power supplying apparatus of claim 10, wherein the second switch is further configured to receive some of harmonics generated by the first switch unit.

14. The power supplying apparatus of claim 10, wherein the second switch is operated alternately with the first switch.

15. The power supplying apparatus of claim 10, wherein the first piezoelectric transformer comprises:
an input piezoelectric layer comprising layers stacked in a first direction;
an output piezoelectric layer comprising layers stacked in a second direction; and
an insulating layer separating the input piezoelectric layer and the output piezoelectric layer.

16. The power supplying apparatus of claim 15, wherein a polarization direction of the first direction is perpendicular to a polarization direction of the second direction.

17. The power supplying apparatus of claim 15, wherein the insulating layer is formed of a thin film material that is softer than ceramic.

18. The power supplying apparatus of claim 15, wherein the insulating layer comprises a hollow portion.

\* \* \* \* \*